United States Patent [19]

Frantz

[11] Patent Number: 4,692,175

[45] Date of Patent: Sep. 8, 1987

[54] TWO-STAGE PRECOALESCER UNIT

[75] Inventor: Virgil L. Frantz, Salem, Va.

[73] Assignee: Roanoke College, Salem, Va.

[21] Appl. No.: 839,956

[22] Filed: Mar. 17, 1986

[51] Int. Cl.[4] ........................ B01D 39/08; B01D 53/26
[52] U.S. Cl. ........................................ 55/218; 55/319;
55/323; 55/333; 55/486; 55/DIG. 17
[58] Field of Search ................. 55/179, 218, 302, 303,
55/319, 323, 333, 486, DIG. 17

[56] References Cited

U.S. PATENT DOCUMENTS

| | | | |
|---|---|---|---|
| 2,413,769 | 1/1947 | Kasten | 55/486 X |
| 3,247,681 | 4/1966 | Hankison et al. | 55/DIG. 17 |
| 3,261,146 | 7/1966 | Malec | 55/218 |
| 3,796,025 | 3/1974 | Kasten | 55/DIG. 17 |
| 3,876,400 | 4/1975 | Frantz | 55/486 X |
| 4,203,739 | 5/1980 | Erdmannsdörfer | 55/323 |
| 4,231,768 | 11/1980 | Seibert et al. | 55/179 |
| 4,259,097 | 3/1981 | Patel et al. | 55/DIG. 17 |
| 4,468,239 | 8/1984 | Frantz | 55/179 X |
| 4,487,618 | 12/1984 | Mann | 55/323 |
| 4,519,819 | 5/1985 | Frantz | 55/218 X |

Primary Examiner—Robert Spitzer
Attorney, Agent, or Firm—Wilmer Mechlin

[57] ABSTRACT

Two-stage precoalescer unit for filtering, coalescing and separating from contaminated compressed gas loose oil and water in a first stage and oil and water aerosol or vapor in a second stage, the coalescers of the first and second stages being mounted in tandem in a perforate-walled canister contained in a housing within an imperforate tube, the first-stage coalescer relatively permanently for periodic purging by gravity and a reverse flow of gas and the second-stage coalescer removably, for purging over an extended period by a reverse flow of purge gas and thereafter removal and replacement on detachment of a lower from an upper part of the housing, and a spring-pressed floating follower in the housing above and acting downwardly on the canister for compensating for manufacturing tolerances in components of the precoalescer unit.

9 Claims, 4 Drawing Figures

TWO-STAGE PRECOALESCER UNIT

BACKGROUND OF THE INVENTION

Compressed gas from a compressor or other source usually contains as contaminants water and oil in both loose or liquid and aerosol or vapor states. Since the presence of either or both of these contaminants may detrimentally affect devices operated by compressed gas, it is customary to subject the contaminated gas to filtration to at least reduce its contaminant content and an effective way to reduce its moisture content is by adsorbtion by a molecular sieve or other desiccant. However, the problem this presents is that a desiccant, such as a molecular sieve, when exposed to oil in either a liquid or an aerosol or vapor state, soon becomes coated with oil which blocks or clogs the openings in the particles of the desiccant through which they adsorb moisture. In the more efficient assemblies for decontaminating compressed gas, such as the twin tower assembly of my U.S. Pat. No. 4,468,239 ('239), it therefore is the practice to include in advance or upstream of the desiccant an inbuilt oil separator adapted to coalesce and separate at least part of the oil from the gas. An improvement on that practice is that disclosed in my U.S. Pat. No. 4,519,819, issued May 28, 1985, in which the contaminated compressed gas, before entering the filtering or decontaminating assembly, is passed through a precoalescer unit adapted to coalesce and separate oil from the gas. Designed for use with the Twin Tower Assembly of the above Frantz U.S. Pat. No. 4,468,239 ('239), the precoalescer unit of the later patent is a single-stage unit particularly suited for coalescing and separating oil in the form of a fine mist or aerosol. More effective still and adapted for use with either a heavy-duty decontaminating assembly, such as the Twin Tower Assembly of patent '239, for diesel locomotive or industrial installations or lighter duty decontaminating assemblies or units adapted for installation on rapid-transit cars, busses and trucks, either alone or in advance of a one unit or tower filter assembly, is the two-stage coalescer unit of the present invention.

SUMMARY OF THE INVENTION

The primary object of the present invention is to provide a two-stage precoalescer unit for filtering, coalescing and separating in successive stages loose or liquid oil and water and oil and water in aerosol or vapor state from contaminated compressed gas.

Another object of the invention is to provide a two-stage precoalescer unit positionable in the flow path of contaminated gas from a source to a desiccant-containing decontaminating assembly which not only coalesces and separates loose oil and water and oil and water in aerosol or vapor state from the gas in successive stages but is cyclically purged of oil coalesced and separated by the stages.

An additional object of the invention is to provide a two-stage precoalescer unit for a compressed gas decontaminator or decontaminating assembly or unit which has as its only component requiring periodic removal and replacement after an extended period of service, the aerosol or vapor coalescer of the second stage and that coalescer is readily accessible by detachment of a lower from an upper part of the coalescer unit's housing.

A further object of the invention is to provide a two-stage coalescer unit wherein the coalescers for filtering, coalescing and separating in succession from contaminated source compressed gas, loose oil and water and oil and water aerosol or vapor, are mounted in tandem in a foraminous-walled canister contained in a housing inside an imperforate tube and for ready access to the canister for removal and replacement of the second stage coalescer, the housing has detachable upper and lower parts and the imperforate tube has a friction and sealing fit with cap members at its and the canister's opposite ends.

Yet another object of the invention is to provide a two-stage precoalescer unit of the character described in the immediately preceding object, wherein a spring-pressed floating follower in the housing and acting downwardly on the canister compensates for manufacturing tolerances in parts of the precoalescer unit.

A further object of the invention is to provide a two-stage precoalescer unit having outlet and drain ports alternately openable by individually spring-urged internal outlet and drain valves, the valves being mounted on a common stem with sufficient relative lost motion for ensuring that the drain valve is closed when the outlet valve is open.

The foregoing and other objects and advantages of the invention will appear hereafter in the detailed description, be particularly pointed out in the appended claims and be illustrated in the accompanying drawings, in which:

FIGURE DESCRIPTION

FIG. 1 is a vertical sectional view of a preferred embodiment of the two-stage precoalescer unit of the present invention;

FIG. 2 is another or second embodiment of the two-stage precoalescer unit of the present invention; and FIGS. 3 and 4 are horizontal sectional views on an enlarged scale, taken respectively along lines 3—3 and 4—4 of FIG. 1, showing the first and second stage coalescers preferred for both of the illustrated embodiments.

DETAILED DESCRIPTION

Figure 1:
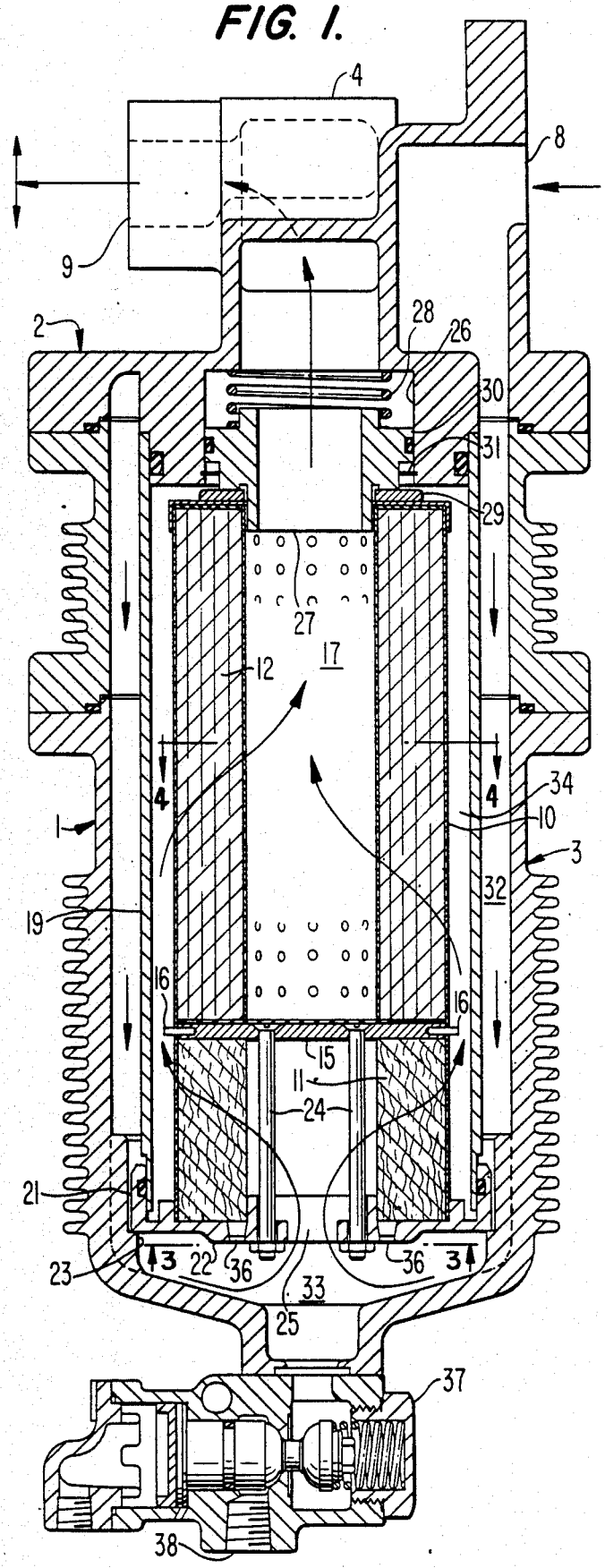

Referring now in detail to the drawings in which like reference characters designate like parts, the two-stage precoalescer unit of the present invention in each of the illustrated exbodiments is adapted for use in separating and removing from contaminated compressed gas in successive stages loose or liquid oil and water and oil and water aerosol or vapor and is particularly designed for use with and mounting, positioning or installing in the flow path of contaminated compressed gas from a compressor or other source in advance or upstream of a decontaminating or filter assembly or unit dependent upon a particulate desiccant, such as a molecular sieve, for selectively adsorbing moisture from compressed gas. While an efficient agent or medium for separating and removing moisture from contaminated compressed gas and regenerable in situ by being alternately cycled between decontaminating and purge cycles, in the latter of which it is subjected to a reverse flow of purge gas, a molecular sieve or other desiccant will have its adsorbtive capacity for moisture drastically reduced by exposure to oil contained in the compressed gas passed through it. This phenomenon is a result of coating and consequent plugging and blocking by the oil of the openings in the desiccant particles, water-molecule size in molecular sieves, through which the particles adsorb moisture and, once blocked, the openings cannot be effectively reopened by reverse-flowing purge gas. If a molecular sieve desiccant is to adsorb moisture at its maximum potential, it therefore must be protected against exposure to oil and it is this protection that the improved two-stage precoalescer unit of the present invention is particularly adapted to afford.

Figure 2:
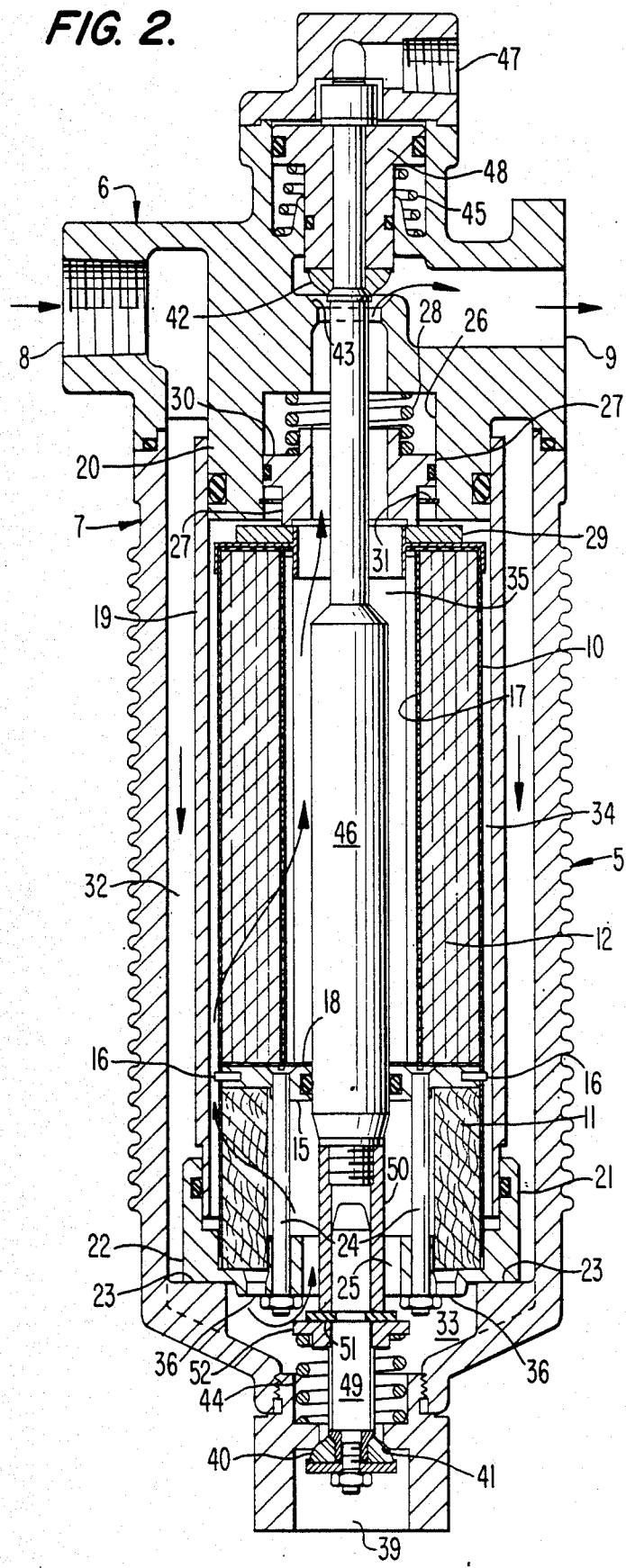
Figure 3:
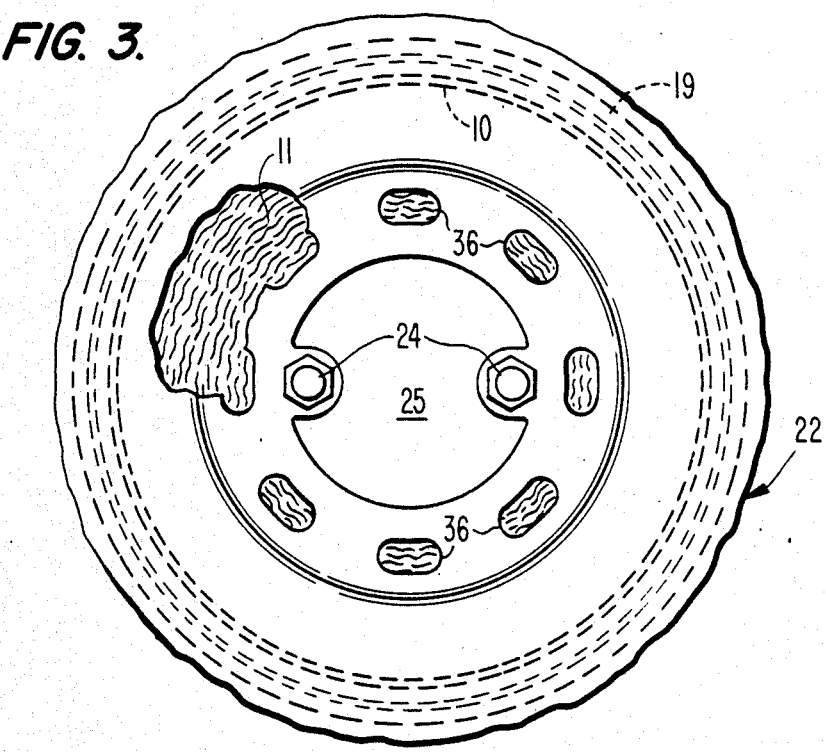
Figure 4:
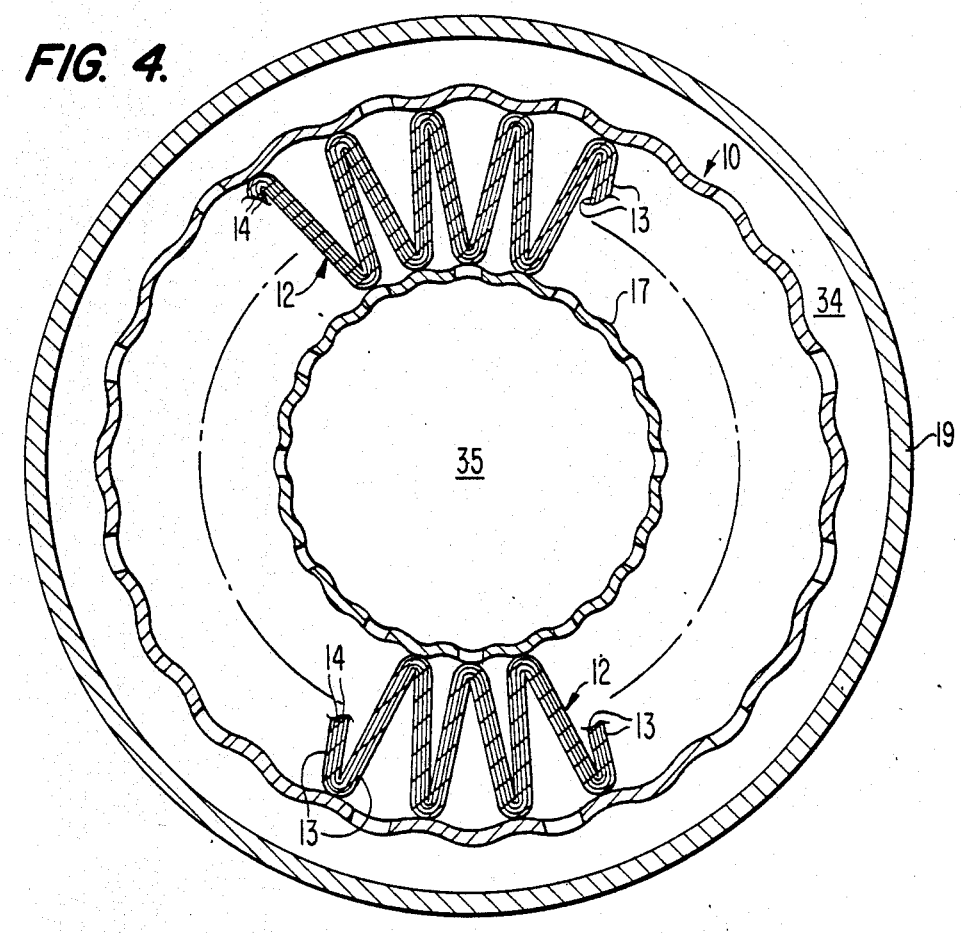

The embodiments of FIGS. 1 and 2, when used with a decontaminating or filter assembly or unit containing a desiccant for adsorbing moisture, are installable in advance or upstream of the assembly or unit in the flow path thereto of contaminated compressed gas from a compressor or other source. The embodiment of FIG. 1 is especially designed for use with the twin tower decontaminating assembly shown and described in my U.S. Pat. No. 4.468,239 ('239), the disclosure of which is herein incorporated by reference. Designated as 1, the embodiment of FIG. 1 is adapted for direct attachment to the twin tower assembly of patent '239 by incorporating as an integral or unitary part in a top cap or upper part 2 of the unit's housing 3 an intake manifold 4 mountable on the twin tower assembly in place of the intake manifold numbered 9 in the patent. The embodiment of FIG. 2, designated as 5, also has a top cap or upper part 6 of its housing 7 and in each of the embodiments, the unit's inlet and outlet ports 8 and 9 respectively, suitably are in or formed in the unit's top cap 2 or 6.

Although differing in several respects, the units 1 and 5 in many respects are similar. Thus, each unit mounts or contains in tandem in a foraminous or perforate-walled canister 10 a lower or first stage coalescer 11 and an upper or second stage coalescer 12. For filtering, coalescing and separating loose oil and water, the first stage coalescer 11 suitably is a knitted stainless steel wire mesh open-ended hollow cylinder or tube, while for coalescing and separating oil and water aerosol or vapor, the secondary or second stage coalescer 12 preferably is a multilayered pleated hollow cylindrical or tubular member sandwiching between outer and inner supporting or strengthening fiberglass layers or coatings 13, a plurality of coalescing layers 14 of randomly arranged epoxy or other suitable resin-coated or bonded borosilicate fibers of different densities, of which the outer or, in terms of air flow, leading layer is the less dense or coarser. The lower and upper stage coalescers 11 and 12 are separated and spaced by a circular separating disk or plate 15 pinned or locked in place to the side of the canister, suitably by rollpins 16. Both the upper coalescer 12 and an inner foraminous or perforate liner 17 between which and the side of the canister 10 the upper coalescer is contained, rest or are supported on the separating disk 15 through a rubber or like circular cushioning or sealing pad or gasket 18.

In each of the embodiments, the canister 10 containing the lower or first stage and upper or second stage coalescers 11 and 12, in turn is contained in a cylindrical imperforate sleeve or tube 19, which at its upper end encircles and has an internal friction and sealing fit with a collar or boss 20 on or rigid with and depending from the top cap 2 or 6 and at its lower end or bottom encircles and externally has a friction and sealing fit with an upstanding or upturned peripheral flange 21 of an internal lower cap 22 normally seating and supported on a plurality of circumferentially spaced abutments or shoulders 23 instanding radially from the side of the housing 3 or 7. The similarities of the embodiments of FIGS. 1 and 2 extend also to the connection of the spacer disk 15 to the lower cap 22 by connecting bolts 24 and the provision in the lower cap of a central or axial bore or opening 25.

In each of the embodiments of FIGS. 1 and 2 there is contained in a cylindrical chamber 26 in the top cap 2 or 6 above and centered axially on the canister 10 a centrally or axially bored floating follower 27 urged downwardly by a coil spring 28 reacting upwardly against the top cap and acting downwardly on the floating follower for urging the latter through an interposed washer 29 downwardly against the canister. With an annular flange 30 sealingly engaging a side of the chamber 26 and limited in downward movement by a retaining or lock ring 31 in the chamber 26 below its flange, the floating follower 27 effectively compensates for longitudinal manufacturing tolerances in the interacting or interfitting elements in each of the embodiments.

The embodiments of FIGS. 1 and 2 are similar in the foregoing respects and also in externally finning sides of their housings 3 and 7 for assisting in dissipating heat from the usually hot gasses received through their inlet ports 8. In each embodiment the contaminated gas flows from the inlet port 8 down through an annular passage 32 between the side of the housing 3 or 7 and the sleeve 19, past the instanding abutments 23 in the housing and, reversing direction in the sump 33 in the bottom of the housing 3 or 7. up through the central opening 25 in the lower cap 22, out through the side of the lower coalescer 11 to the passage 34 between the canister 10 and the sleeve 19 and, above the spacer disk 15, inwardly through a side of the upper coalescer 12 to the central passage 35 inside the liner 17 and thence to the outlet port 9.

The lower coalescer 11 of each embodiment in the form of the preferred knitted stainless steel wire mesh hollow cylinder, functions as a combined filter and coalescer that not only filters and coalesces and separates loose or liquid oil and water contained in the contaminated gas passed through it but is drained by gravity of and discharges separated oil through a plurality of underlying circumferentially spaced drain openings 36 in the lower cap 22. In the embodiment of FIG. 1, drainage of separated oil from the lower or first stage coalescer is assisted during the short interval in opening and closing in which the double-headed drain valve 37 of FIG. 1 is open, conveniently under the cyclic control of a timer, such as disclosed in the twin tower assembly of patent '239, by the sudden release of the compressed gas contained in the housing 3 which produces not only a reverse flow of purge gas for purging both of the coalescers 11 and 12 of separated oil and water but also a blast or pressure burst for discharging the oil and water so purged and that accumulated in the sump 33 through the drain port 38.

In the embodiment of FIG. 2, loose oil and water coalesced and separated by the first stage coalescer 11 and drained by gravity through the drain openings 36 in the lower cap 22, is discharged through the drain port 39 and purging of the first and second stage coalescers is obtained, as in the embodiment of FIG. 1, by a reverse flow of purge gas produced by the compressed gas contained in the housing 7 when the drain port is opened.

As opposed to the coalescer unit of FIG. 1, that of FIG. 2 has its outlet port 9 and drain port 39 alternately openable by internal valving including a normally closed drain valve 40 closing upwardly against a drain valve seat 41 and a normally open outlet valve 42 closing downwardly against an outlet valve seat 43. The valves 40 and 42 are yieldably held in their normal positions by individual springs designated as 44 for the drain valve and 45 for the outlet valve. Mounted at vertical spacing on opposite end portions of a common stem or shank 46 extending axially through central passages and openings in the intervening components of the two-stage precoalescer unit 5 of the second embodiment, the valves 40 and 42 are actuated substantially simultaneously, respectively to open and close, by actuating gas applied through an actuating gas port 47 on a piston 48 mounted on the same stem 46 and mounting the outlet valve. To ensure that the drain valve 40 is closed when the outlet valve 42 opens, the stem 46 has a slip joint adjacent its lower end in the form of a rod 49 mounting the drain valve and telescoping or slidably received in a tubular extension 50 screwed onto the lower end of the solid part of the stem. The rod 49 is peripherally grooved to seat a snap ring 51 sandwiched between the lower end of the extension 50 and the upper or floating spring seat 52 of the drain valve spring 44. With the stem 42 so constructed, the drain valve 40 will close under force of its own spring 41 whenever gas pressure on the piston 48 is released.

Purged by both gravity drainage and periodic reverse flowing purge gas, the first stage coalescer 11 will function effectively indefinitely. However, with its purging practically limited to the periodic reverse flows of purge gas, the second stage coalescer, after about three years of service, will usually require replacement. This is easily accomplished, requiring only detachment of the top cap 2 or 6 from the lower part of the housing 3 or 7, whereupon the second stage coalescer is readily accessible for removal and replacement.

From the above detailed description it will be apparent that there has been provided a two-stage coalescer unit not only adapted to filter and coalesce and separate from contaminated compressed gas in successive stages loose or liquid oil and water and oil and water aerosol or vapor but requiring for operation over extended periods cyclic opening of a drain valve for purging the first and second stage coalescers and detachment of upper and lower parts of the housing for removal and replacement of the second stage coalescer after several years of service.

It should be understood that the described and disclosed embodiments are merely exemplary of the invention and that all modifications are intended to be included that do not depart from the spirit of the invention and the scope of the appended claims.

Having now described my invention, I claim:

1. A two-stage precoalescer unit interposable in the flow path of contaminated compressed gas between a compressor or other source and desiccant-containing decontaminating means for coalescing and separating in successive stages loose oil and water and oil and water aerosol from the gas, comprising a housing having separable upper and lower parts, a perforate-walled canister in said housing, first and second stage coalescers mounted in tandem in said canister for respectively filtering, coalescing and separating loose oil and water and coalescing and separating oil and water aerosol from said gas, means in said canister separating said coalescers and forcing said gas to flow therethrough in different directions, and an imperforate tube contained in said housing and containing said canister for defining with said housing and canister flow paths of said gas through said precoalescer unit.

2. A two-stage precoalescer unit according to claim 1, including a detachable top cap on said housing, an annular boss on and depending from said top cap and encircled by and externally frictionally and sealingly fitting an upper end of the imperforate tube, and an axially bored inner cap in the housing and receiving lower ends of the canister and imperforate tube, said inner cap being bolted to the coalescer-separating means in the canister and having an upstanding peripheral flange encircling and internally frictionally and sealingly fitting the lower end of the imperforate tube.

3. A two-stage precoalescer unit according to claim 2, including a plurality of circumferentially spaced openings in said inner cap about the axial bore thereof and below the first stage coalescer for draining from said coalescer into a sump in the housing loose oil and water filtered, coalesced and separated thereby from contaminated gas passed therethrough.

4. A plural-stage precoalescer unit according to claim 1, wherein the decontaminating assembly is a twin tower assembly and the unit includes a detachable top cap incorporating as an integral part an inlet manifold of said assembly.

5. A two-stage precoalescer unit interposable in the flow path of decontaminated compressed gas between a compressor or other source and desiccant-containing decontaminating means for coalescing and separating loose oil and water and oil and water aerosol in successive stages from said gas, comprising a housing having a detachable top cap, inlet and outlet ports in said cap and connectable respectively to said source and said decontaminating means, a perforate-walled canister in said housing below said top cap, vertically spaced first and second stage coalescers mounted in tandem in said canister, and a spring-urged floating follower in said top cap and acting downwardly on said canister for compensating for manufacturing tolerances in said precoalescer unit.

6. A two-stage precoalescer unit according to claim 5, including means in said top cap for limiting downward movement of the floating follower relative thereto, and wherein the second stage coalescer is removably mounted in an upper part of the canister and accessible for removal and replacement on detachment of the top cap from the housing.

7. A plural-stage precoalescer unit positionable in the flow path of contaminated gas from a compressor or other source for coalescing and separating loose oil and water and oil and water vapor from the gas in a plurality of successive stages, comprising a housing, a perforate-walled canister in said housing, first and second stage coalescers contained in tandem in said canister for respectively filtering, coalescing and separating loose oil and water and coalescing and separating oil and water vapor from said gas, inlet, outlet and draing ports in said housing, normally open outlet and normally closed drain valves in the housing and alternately seatable in vertically spaced internal valve seats, a piston mounting said outlet valve and having a head exposable to actuating gas, said valves being mounted on opposite end portions of a common stem for movement in unison against opposing spring forces respectively to open said drain port and close said outlet port on application of actuating gas to said piston.

8. A two-stage precoalescer unit according to claim 7, including a slip joint in said stem for limited relative vertical movement of said outlet and drain valves.

9. A two-stage precoalescer unit according to claim 8, wherein the slip joint includes a tubular extension screwed to a lower end of a main part of said stem, a rod telescopingly received in said extension and therebelow mounting the drain valve, and a snap ring seated in a peripheral groove in said rod and sandwiched between a lower end of said extension and a floating spring seat of a return spring of the drain valve.

* * * * *